United States Patent
Cha et al.

(10) Patent No.: US 11,572,831 B2
(45) Date of Patent: Feb. 7, 2023

(54) HYBRID POWER GENERATION FACILITY AND METHOD OF CONTROLLING SAME

(71) Applicant: DOOSAN ENERBILITY CO., LTD, Changwon (KR)

(72) Inventors: Song-Hun Cha, Osan (KR); Sung Gju Kang, Yongin (KR); Hyo Jun Kim, Suwon (KR); Dong Hun Kim, Changwon (KR); Ki Hyun Lee, Daegu (KR); Sang Wook Kim, Changwon (KR)

(73) Assignee: DOOSAN ENERBILITY CO., LTD., Changwon (KR)

(*) Notice: Subject to any disclaimer, the term of this patent is extended or adjusted under 35 U.S.C. 154(b) by 260 days.

(21) Appl. No.: 17/120,193

(22) Filed: Dec. 13, 2020

(65) Prior Publication Data
US 2022/0136438 A1 May 5, 2022

(30) Foreign Application Priority Data

Oct. 30, 2020 (KR) .................. 10-2020-0143271
Dec. 2, 2020 (KR) .................. 10-2020-0166649

(51) Int. Cl.
*F02C 6/14* (2006.01)
*F01K 23/10* (2006.01)
(Continued)

(52) U.S. Cl.
CPC .............. *F02C 6/14* (2013.01); *F01K 23/10* (2013.01); *F02C 9/28* (2013.01); *H02J 3/003* (2020.01);
(Continued)

(58) Field of Classification Search
CPC .... F02C 6/14; F02C 9/28; F01K 23/10; F01K 23/105; H02J 3/003; H02J 3/46;
(Continued)

(56) References Cited

U.S. PATENT DOCUMENTS 5,649,416 A * 7/1997 Moore ................ F01K 23/101
60/39.15
6,442,924 B1 * 9/2002 Talley ................ F01K 23/106
60/39.182
(Continued)

FOREIGN PATENT DOCUMENTS

JP  2009195860 A  9/2009
JP  2012037180 A  2/2012
(Continued)

*Primary Examiner* — Hoang M Nguyen
(74) *Attorney, Agent, or Firm* — Harvest IP Law LLP

(57) ABSTRACT

Disclosed are a hybrid power generation facility and a control method thereof. The hybrid power generation facility includes a gas turbine including a compressor configured to compress air introduced from an outside, a combustor configured to mix the compressed air with fuel and to combust the air and fuel mixture, and a turbine configured to produce power with first combustion gas discharged from the combustor, a GT (gas turbine) generator configured to generate electric power using a driving force generated by the gas turbine, a boiler including a combustion chamber and configured to mix the first combustion gas supplied from the turbine of the gas turbine with air and fuel supplied from the outside, a steam turbine through which steam generated in the combustion chamber passes, a ST (steam turbine) generator configured to generate electric power using a driving force generated by the steam turbine, and an energy storage system configured to be charged based on a decrease rate of power demand of a grid and a maximum decrease rate of power supply from the GT generator and the ST generator.

21 Claims, 8 Drawing Sheets

(51) Int. Cl.
  *F02C 9/28*    (2006.01)
  *H02J 3/46*    (2006.01)
  *H02J 3/00*    (2006.01)

(52) U.S. Cl.
  CPC ............ *H02J 3/46* (2013.01); *F05D 2220/72* (2013.01); *F05D 2220/74* (2013.01); *F05D 2220/764* (2013.01)

(58) Field of Classification Search
  CPC .... H02J 3/28; F05D 2220/72; F05D 2220/74; F05D 2220/764; Y02E 20/16; Y02E 20/32; Y02E 50/10; F22D 1/325
  USPC .......................... 60/39.182, 793, 39.21, 39.24
  See application file for complete search history.

(56) References Cited

U.S. PATENT DOCUMENTS

| | | | |
|---|---|---|---|
| 8,689,565 B2* | 4/2014 | Guzman ............... | F01K 23/101 60/773 |
| 9,945,264 B2* | 4/2018 | Wichmann ................ | G05F 1/66 |
| 10,584,422 B1* | 3/2020 | Yang ...................... | C01C 1/0405 |

FOREIGN PATENT DOCUMENTS

| | | |
|---|---|---|
| JP | 2019027398 A | 2/2019 |
| KR | 1020130047058 A | 5/2013 |
| KR | 101794325 B1 | 11/2017 |
| KR | 1020180056305 A | 5/2018 |

\* cited by examiner

HYBRID POWER GENERATION FACILITY AND METHOD OF CONTROLLING SAME

CROSS REFERENCE TO RELATED APPLICATIONS

This application claims priority to Korean Patent Application No. 10-2020-0143271, filed on Oct. 30, 2020 and Korean Patent Application No. 10-2020-0166649, filed on Dec. 2, 2020, the disclosures of which are incorporated herein by reference in their entireties.

BACKGROUND

1. Field

The present disclosure relates to a hybrid power generation facility and a control method thereof, and more particularly, to a hybrid power generation facility for generating electric power using a driving force generated by a gas turbine and a steam turbine.

2. Description of the Related Art

There are various types of power plants depending on fuel used. A thermal power plant heats water in a boiler using thermal energy generated by burning fuel such as coal, heavy oil, and natural gas, and passes a high temperature and high pressure superheated steam produced through a steam turbine so that a generator connected to the steam turbine generates electricity.

The thermal power plant includes main equipment and balance of plant (BOP) systems. The BOP systems include, for example, a fuel supply system, a fuel treatment system, a condensate and water supply system, a cooling water system, a reprocessing system, and auxiliary systems such as air treatment system, water treatment system, service water treatment system, and waste water treatment system. The main equipment and BOP systems play their roles in electricity production.

On the other hand, a combined cycle power plant is a power plant that combines a primary power generation cycle in which a gas turbine is driven with fuel such as natural gas or diesel and a secondary power generation cycle in which a steam turbine is driven with steam generated by passing the heat of exhaust gas discharged from the gas turbine through a heat recovery steam generator (HRSG). The combined cycle power plant has the advantage of 10% higher thermal efficiency, less pollution, and shorter resting time than conventional thermal power plants.

Further, a power plant that uses renewable energy such as solar energy is often used in combination with a combined cycle power plant. In this case, because the production of renewable energy fluctuates irregularly and rapidly over time, the output of the combined cycle power plant needs to change rapidly in response to the fluctuation in the production of the renewable energy.

SUMMARY

The present disclosure has been made in view of the problems occurring in the related art, and an objective of the present disclosure is to provide a hybrid power generation facility capable of performing a rapid and stable load-following operation to improve the overall operation efficiency and to cope with fluctuations in production of renewable energy, and a control method thereof.

According to an aspect of the present disclosure, there is provided a hybrid power generation facility including: a gas turbine including a compressor configured to compress air introduced from an outside, a combustor configured to mix the compressed air with fuel and to combust the air and fuel mixture, and a turbine configured to produce power with first combustion gas discharged from the combustor; a GT (gas turbine) generator configured to generate electric power using a driving force generated by the gas turbine; a boiler including a combustion chamber and configured to mix the first combustion gas supplied from the turbine of the gas turbine with air and fuel supplied from the outside; a steam turbine through which steam generated in the combustion chamber passes; a ST (steam turbine) generator configured to generate electric power using a driving force generated by the steam turbine; and an energy storage system configured to be discharged based on an increase rate of power demand of a grid and a maximum increase rate of power supply from the GT generator and the ST generator.

The ST generator may increase the power supply to the grid if the power demand of the grid increases and the maximum increase rate of the power supply from the ST generator exceeds the increase rate of the power demand of the grid.

If the maximum increase rate of the power supply from the ST generator is equal to or less than the increase rate of the power demand of the grid and if a sum of the maximum increase rate of the power supply from the ST generator to the grid and the maximum increase rate of the power supply from the GT generator to the grid is equal to or greater than the increase rate of the power demand of the grid, the ST generator and the GT generator may increase the power supply to the grid.

If the sum of the maximum increase rate of the power supply from the ST generator to the grid and the maximum increase rate of the power supply from the GT generator to the grid is less than the increase rate of the power demand of the grid, the energy storage system may be discharged to supply electric power to the grid, and the ST generator and the GT generator may increase the power supply to the grid.

According to another aspect of the present disclosure, there is provided a hybrid power generation facility including: a gas turbine including a compressor configured to compress air introduced from an outside, a combustor configured to mix the compressed air with fuel and to combust the air and fuel mixture, and a turbine configured to produce power with first combustion gas discharged from the combustor; a GT (gas turbine) generator configured to generate electric power using a driving force generated by the gas turbine; a boiler including a combustion chamber and configured to mix the first combustion gas supplied from the turbine of the gas turbine with air and fuel supplied from the outside; a steam turbine through which steam generated in the combustion chamber passes; a ST (steam turbine) generator configured to generate electric power using a driving force generated by the steam turbine; and an energy storage system configured to be charged based on a decrease rate of power demand of a grid and a maximum decrease rate of power supply from the GT generator and the ST generator.

The ST generator may decrease the power supply to the grid if the power demand of the grid decreases and the maximum decrease rate of the power supply from the ST generator exceeds the decrease rate of the power demand of the grid.

If the maximum decrease rate of the power supply from the ST generator is equal to or less than the decrease rate of the power demand of the grid and if a sum of the maximum decrease rate of the power supply from the ST generator to the grid and the maximum decrease rate of the power supply from the GT generator to the grid is equal to or greater than the decrease rate of the power demand of the grid, the ST generator and the GT generator may decrease the power supply to the grid.

If the sum of the maximum decrease rate of the power supply from the ST generator to the grid and the maximum decrease rate of the power supply from the GT generator to the grid is less than the decrease rate of the power demand of the grid, the energy storage system may be charged with electric power supplied from the ST generator and the GT generator, and the ST generator and the GT generator may decrease the power supply to the grid.

The steam turbine may include a high-pressure turbine configured to pass steam supplied from the boiler and to return the steam passing through the high-pressure turbine to the boiler, an intermediate-pressure turbine connected to the high-pressure turbine and configured to pass steam supplied from the boiler, and a low-pressure turbine connected to the intermediate-pressure turbine and configured to pass the steam passing through the intermediate-pressure turbine. The hybrid power generation facility may further include a water supply device configured to heat water with steam extracted from the steam turbine and return the heated water to the boiler.

The hybrid power generation facility may further include a first heat exchanger through which second combustion gas discharged from the boiler passes and a portion of water flowing into the water supply device passes.

The hybrid power generation facility may further include an indirect firing system including a mixer configured to mix coal, a pulverizer configured to pulverize the coal into coal particles, and a storage configured to store the coal particles discharged from the pulverizer and to supply the coal particles to the boiler.

The hybrid power generation facility may further include an electric precipitator and a flue gas desulfurization system through which second combustion gas discharged from the boiler passes.

The hybrid power generation facility may further include: an electric precipitator and a flue gas desulfurization system through which second combustion gas discharged from the boiler passes; and a first collecting device configured to pass the second combustion gas discharged from the flue gas desulfurization system, to pass a portion of the steam extracted from the low-pressure turbine, and to return the steam passing therethrough to the water supply device.

The hybrid power generation facility may further include a second heat exchanger through which carbon dioxide partially collected from the first collecting device is compressed and passed, and water partially extracted from the water supply device is passed.

The hybrid power generation facility may further include a first heater installed at an input port of the electric precipitator, a second collecting device installed at an output port of the flue gas desulfurization system and configured to collect dust, and a second heater installed on a path between the first collecting device and a stack.

According to another aspect of the present disclosure, there is provided a method of controlling a hybrid power generation facility including a gas turbine including a compressor configured to compress air introduced from an outside, a combustor configured to mix the compressed air with fuel and to combust the air and fuel mixture, and a turbine configured to produce power with first combustion gas discharged from the combustor, a GT (gas turbine) generator configured to generate electric power using a driving force generated by the gas turbine, a boiler including a combustion chamber and configured to mix the first combustion gas supplied from the turbine of the gas turbine with air and fuel supplied from the outside, a steam turbine through which steam generated in the combustion chamber passes, a ST (steam turbine) generator configured to generate electric power using a driving force generated by the steam turbine, and an energy storage system configured to be discharged based on an increase rate of power demand of a grid and a maximum increase rate of power supply from the GT generator and the ST generator, the method including: increasing, by the ST generator, the power supply to the grid if the power demand of the grid increases and the maximum increase rate of the power supply from the ST generator exceeds the increase rate of the power demand of the grid.

The method may further include increasing, by the ST generator and the GT generator, the power supply to the grid if the maximum increase rate of the power supply from the ST generator is equal to or less than the increase rate of the power demand of the grid and if a sum of the maximum increase rate of the power supply from the ST generator to the grid and a maximum increase rate of the power supply from the GT generator to the grid is equal to or greater than the increase rate of the power demand of the grid.

The method may further include discharging the energy storage system to supply electric power to the grid, and increasing, by the ST generator and the GT generator, the power supply to the grid if the sum of the maximum increase rate of the power supply from the ST generator to the grid and the maximum increase rate of the power supply from the GT generator to the grid is less than the increase rate of the power demand of the grid.

According to another aspect of the present disclosure, there is provided a method of controlling a hybrid power generation facility including a gas turbine including a compressor configured to compress air introduced from an outside, a combustor configured to mix the compressed air with fuel and to combust the air and fuel mixture, and a turbine configured to produce power with first combustion gas discharged from the combustor, a GT (gas turbine) generator configured to generate electric power using a driving force generated by the gas turbine, a boiler including a combustion chamber and configured to mix the first combustion gas supplied from the turbine of the gas turbine with air and fuel supplied from the outside, a steam turbine through which steam generated in the combustion chamber passes, a ST (steam turbine) generator configured to generate electric power using a driving force generated by the steam turbine, and an energy storage system configured to be charged based on a decrease rate of power demand of a grid and a maximum decrease rate of power supply from the GT generator and the ST generator, the method including: decreasing, by the ST generator, the power supply to the grid if the power demand of the grid decreases and the maximum decrease rate of the power supply from the ST generator exceeds the decrease rate of the power demand of the grid.

The method may further include decreasing, by the ST generator and the GT generator, the power supply to the grid if the maximum decrease rate of the power supply from the ST generator to the grid is equal to or less than the decrease rate of the power demand of the grid and if a sum of the maximum decrease rate of the power supply from the ST generator to the grid and the maximum decrease rate of the power supply from the GT generator to the grid is equal to or greater than the decrease rate of the power demand of the grid.

The method may further include charging the energy storage system with electric power supplied from the ST generator and the GT generator, and decreasing, by the ST generator and the GT generator, the power supply to the grid when the sum of the maximum decrease rate of the power supply from the ST generator to the grid and the maximum decrease rate of the power supply from the GT generator to the grid is less than the decrease rate of the power demand of the grid.

The hybrid power generation facility and a control method according to the present disclosure can respond to a rapid load change of 20%/min or more from the lowest load to the highest load because the gas turbine, the steam turbine, and the energy storage system operate in conjunction with each other. For example, the steam turbine is responsible for an intermediate load, and the gas turbine and the energy storage device are in charge of an additional load. Therefore, the hybrid power generation facility can cope with irregular fluctuations in production of renewable energy and rapidly and stably perform a load-following operation, thereby improving the overall operation efficiency thereof.

DETAILED DESCRIPTION OF THE DISCLOSURE

Figure 1:
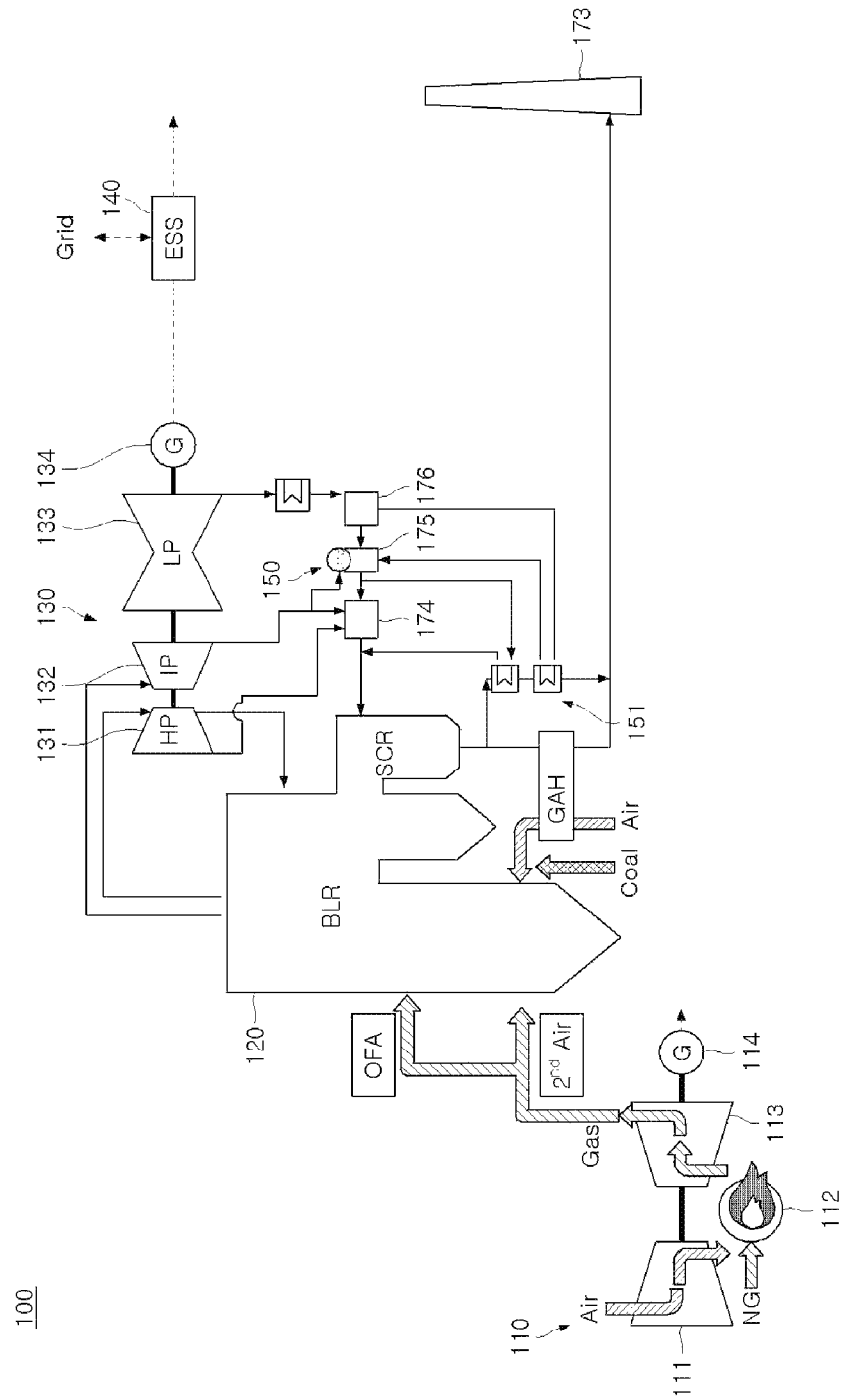
FIG. 1 is a diagram illustrating a hybrid power generation facility according to a first exemplary embodiment.

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Referring to FIG. 1, a hybrid power generation facility 100 according to a first exemplary embodiment includes a gas turbine 110, a GT (gas turbine) generator 114, a boiler 120, a steam turbine 130, and a ST (steam turbine) generator 134, an energy storage system (ESS) 140, a water supply device 150, a first heat exchanger 151, and a stack 173.

The gas turbine 110 includes a compressor 111, a combustor 112, and a turbine 113. The compressor 111 compresses air introduced from an outside to produce compressed air. The combustor 112 mixes the compressed air supplied from the compressor 111 with fuel and burns the air-fuel mixture. The fuel may be natural gas (NG). The turbine 113 generates a driving force used for generation of electric power using first combustion gas supplied from the combustor 112. The GT generator 114 is connected to the gas turbine 110 and generates electric power using the driving force generated by the gas turbine 110.

The boiler 120 receives the first combustion gas from the gas turbine 110 and mixes it with coal and air for combustion. In addition, the boiler 120 generates steam by heating water with combustion heat. The generated steam is supplied to the steam turbine 130, and second combustion gas generated through the combustion is supplied to the stack 173.

The steam turbine 130 includes a high-pressure turbine 131, an intermediate-pressure turbine 132, and a low-pressure turbine 133. The high-pressure turbine 130 passes the steam discharged from the boiler 120 and returns the steam to the boiler 120. The intermediate-pressure turbine 130 receives the steam discharged from the boiler 120, passes the steam, and transfers the steam to the low-pressure turbine 133. The low-pressure turbine 130 receives the steam passing through the intermediate-pressure turbine 132, passes the steam, and supplies the steam to the water supply device 150. The ST generator 134 is connected to the steam turbine 130 and generates electric power with the driving force generated by the steam turbine 130.

The water supply device 150 heats water with steam supplied from the steam turbine 130 and returns the heated steam to the boiler 120. For example, the water supply device 150 includes a high-pressure water heater 174, an intermediate-pressure water heater 175, and a low-pressure water heater 176. The low-pressure water heater 176 heats a low-temperature and low-pressure water with the steam supplied from the low-pressure turbine 133. The intermediate-pressure water heater 175 receives water from the low-pressure water heater 176 and heats the supplied water with a portion of the steam supplied from the intermediate-pressure turbine 132. The intermediate-pressure water heater 175 includes a deaerator, and a portion of the steam supplied from the intermediate-pressure turbine 132 is supplied to the deaerator. That is, the steam is supplied to the intermediate-pressure water heater 175. The high-pressure water heater 174 receives water from the intermediate-pressure water heater 175 and heats the supplied high-pressure and intermediate-temperature water with part of the steam supplied from the high-pressure turbine 131 and the steam supplied from the intermediate-pressure turbine 132. The water heated by the high-pressure water heater 174 is returned to the boiler 120.

The first heat exchanger 151 is configured such that the second combustion gas discharged from the boiler 120 passes therethrough, and the high-pressure or low-pressure water flowing into the water supply device 150 selectively passes through the first heat exchanger 151. Therefore, the first heat exchanger 151 performs heat exchange between the second combustion gas and the feed water. As illustrated in FIG. 1, the water supply device 150 is configured to have multiple heating stages, and the first heat exchanger 151 is configured to have multiple heat exchange states to correspond to the water supply device 150.

The energy storage system (ESS) 140 is discharged if the power demand of the grid is greater than the power supply from the GT generator 114 and the ST generator 134, and is charged if the power supply from the GT generator 114 and the ST generator 134 is greater than the power demand of the grid.

Figure 2:
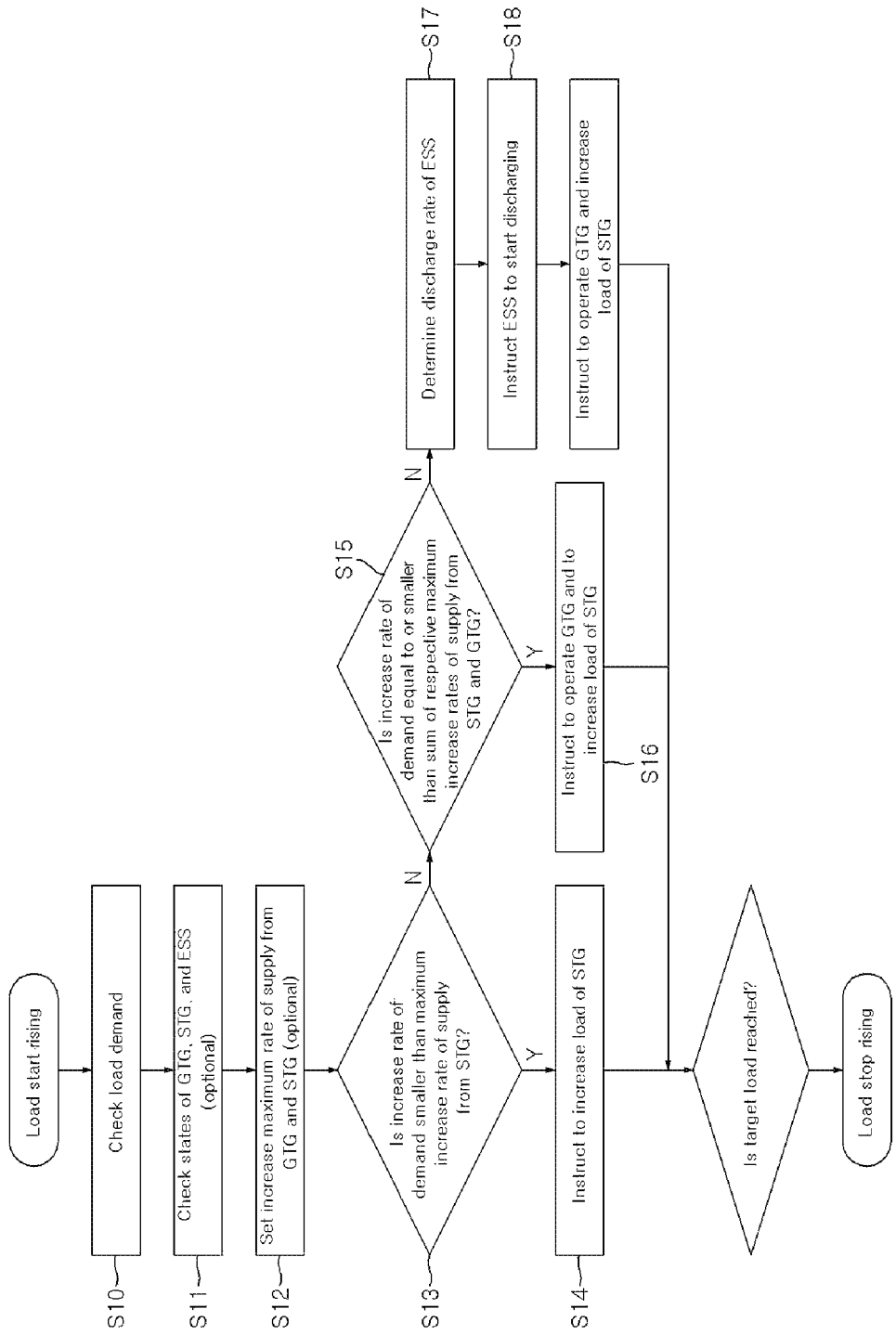
FIG. 2 is a flowchart illustrating a method of controlling the hybrid power generation facility illustrated in FIG. 1 when power demand in a power grid increases.

Referring to FIG. 2, a method of controlling the hybrid power generation facility according to the first exemplary embodiment starts by checking the power demand of the grid when the power demand of the grid increases (step S10). Next, the states of the ST generator 134, the GT generator 114, and the energy storage system 140 are checked (step S11), and the maximum increase rate of the power supplied from the ST generator 134, the GT generator 114, and the energy storage system 140 is determined (step S12). Here, steps S11 and S12 are not essential steps in the control method of the hybrid power generation facility according to the present disclosure.

Next, it is determined whether the maximum increase rate of the power supplied from the ST generator 134 exceeds the increase rate of the power demand of the grid (step S13). If the maximum increase rate of the power supplied from the ST generator 134 is greater than the increase rate of the power demand of the grid, the ST generator 134 increases the power supplied to the grid (step S14). If the maximum increase rate of the power supplied from the ST generator 134 is less than or equal to the increase rate of the power demand of the grid, the ST generator 134 and the GT generator 114 supply power to the grid (step S16).

For example, it is determined whether the sum of the maximum increase rate of the power supplied from the ST generator 134 and the GT generator 114 to the grid is equal to or greater than the increase rate of the power demand of the grid (step S15). If the sum of the maximum increase rate of the power supplied from the ST generator 134 and the GT generator 114 is equal to or greater than the increase rate of the power demand of the grid, the ST generator 134 and the GT generator 114 increase the power supplied to the grid (step S16). If the sum of the maximum increase rate of the power supplied from the ST generator 134 and the GT generator 114 to the grid is less than the increase rate of the power demand of the grid, the discharge rate of the energy storage system 140 is determined first (step S17), and the energy storage system 140 supplies power to the grid through discharging (step S18).

Figure 3:
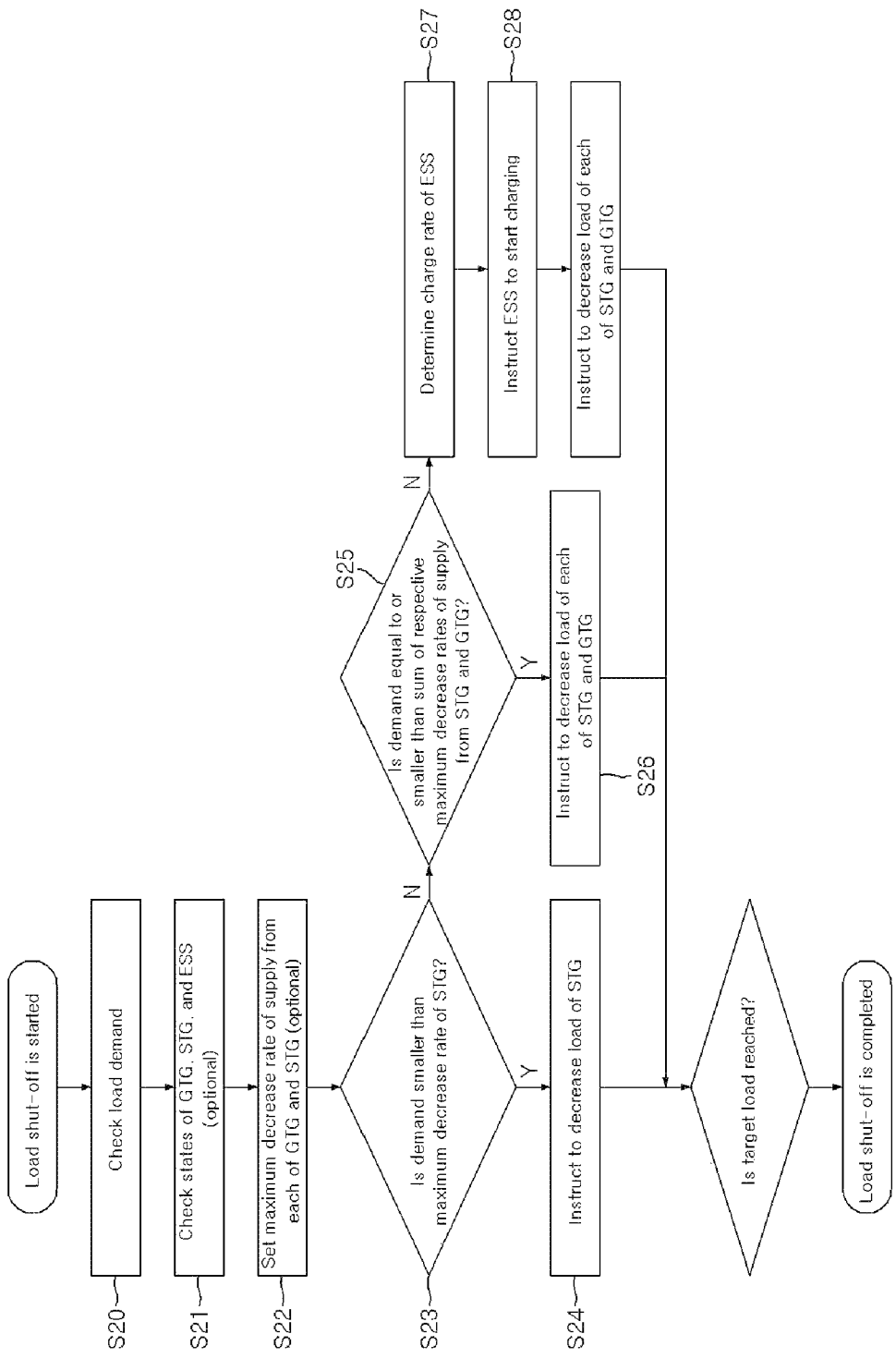
FIG. 3 is a flowchart illustrating a method of controlling the hybrid power generation facility illustrated in FIG. 1 when power demand in a power grid decreases.

Referring to FIG. 3, a method of controlling the hybrid power generation facility according to the first exemplary embodiment starts by checking the power demand of the grid when the power demand of the grid decreases (step S20). Next, the states of the ST generator 134, the GT generator 114, and the energy storage system 140 are checked (step S21), and the maximum decrease rate of the power supplied from the ST generator 134, the GT generator 114, and the energy storage system 140 is determined (step S22). Here, steps S21 and S22 are not essential steps in the control method of the hybrid power generation facility according to the present disclosure.

Next, it is determined whether the maximum decrease rate of the power supplied from the ST generator 134 exceeds the decrease rate of the power demand of the grid (step S23). If the maximum decrease rate of the power supplied from the ST generator 134 is greater than the decrease rate of the power demand of the grid, the ST generator 134 decreases the power supplied to the grid (step S24). if the maximum decrease rate of the power supplied from the ST generator 134 is less than or equal to the decrease rate of the power demand of the grid, the ST generator 134 and the GT generator 114 decrease the power supplied to the grid (step S26).

For example, it is determined whether the sum of the maximum decrease rate of the power supplied from the ST generator 134 and the GT generator 114 to the grid is equal to or greater than the decrease rate of the power demand of the grid (step S25). If the sum of the maximum decrease rate of the power supplied from the ST generator 134 and the GT generator 114 to the grid is or equal to or greater than the decrease rate of the power demand of the grid, the ST generator 134 and the GT generator 114 decrease the power supplied to the grid (step S26). If the sum of the maximum decrease rate of the power supplied from the ST generator 134 and the GT generator 114 to the grid is less than the decrease rate of the power demand of the grid, the charge rate of the energy storage system 140 is determined first (step S27), and the energy storage system 140 receives power from the ST generator 134 and the GT generator 114 so that the energy storage system 140 is charged (step S28).

In the hybrid power generation facility 100 and a control method thereof according to the present disclosure, the energy storage system 140 is combined with the GT generator 114 and the ST generator 134. Therefore, the hybrid power generation facility 100 can respond to a rapid load change of 20%/min or more from the lowest load to the highest load. The ST generator 134 is responsible for the intermediate load, and the GT generator 114 and the energy storage system 140 are in charge of the additional load, so that even one power plant can eliminate irregular fluctuations in production of renewable energy in the surrounding area.

Figure 4:
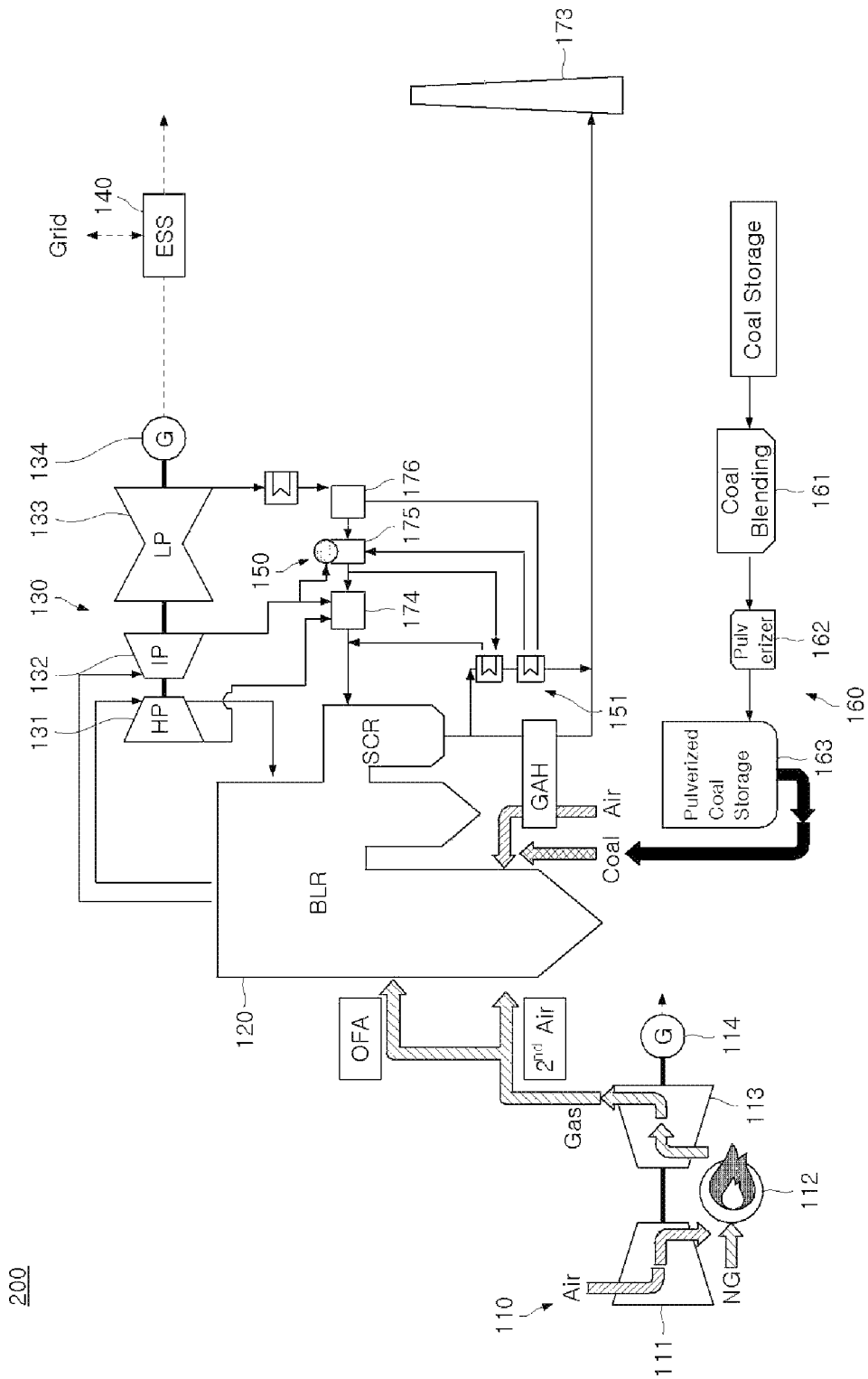
FIG. 4 is a diagram illustrating a hybrid power generation facility according to a second exemplary embodiment.

Referring to FIG. 4, a hybrid power generation facility 200 according to a second exemplary embodiment further includes an indirect firing system (IFS) 160. The indirect firing system 160 includes a mixer 161, a pulverizer 162, and a storage 163. The mixer 161 mixes coal. The pulverizer 162 pulverizes the coal that has passed through the mixer 161. The storage 163 stores coal that has passed through the pulverizer 162 and supplies coal particles to the boiler 120. According to the second exemplary embodiment, the boiler 120 is capable of rapid start-up and load-adaptable operation.

Figure 5:
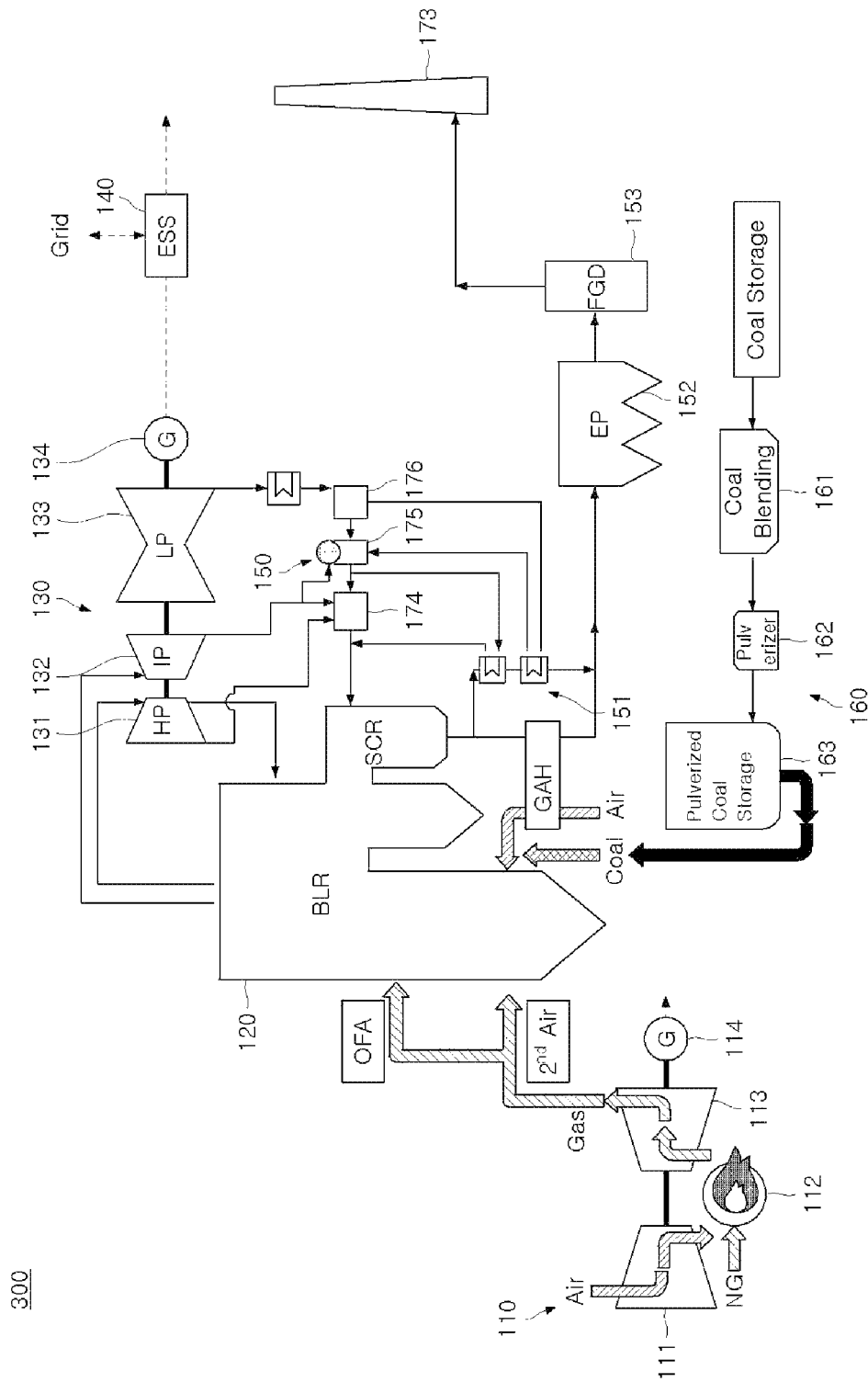
FIG. 5 is a diagram illustrating a hybrid power generation facility according to a third exemplary embodiment.

Referring to FIG. 5, a hybrid power generation facility 300 according to a third exemplary embodiment further includes an electric precipitator (EP) 152 and a flue gas desulfurization system (FGD) 153. The electric precipitator 152 electrically collects dust existing in the second combustion gas discharged from the boiler 120. The flue gas desulfurization system 153 is disposed on the downstream side of the electric precipitator 152, collects sulfur components present in the second combustion gas that has passed through the electric precipitator 152, and supplies the sulfur-free second combustion gas to the stack 173.

Figure 6:
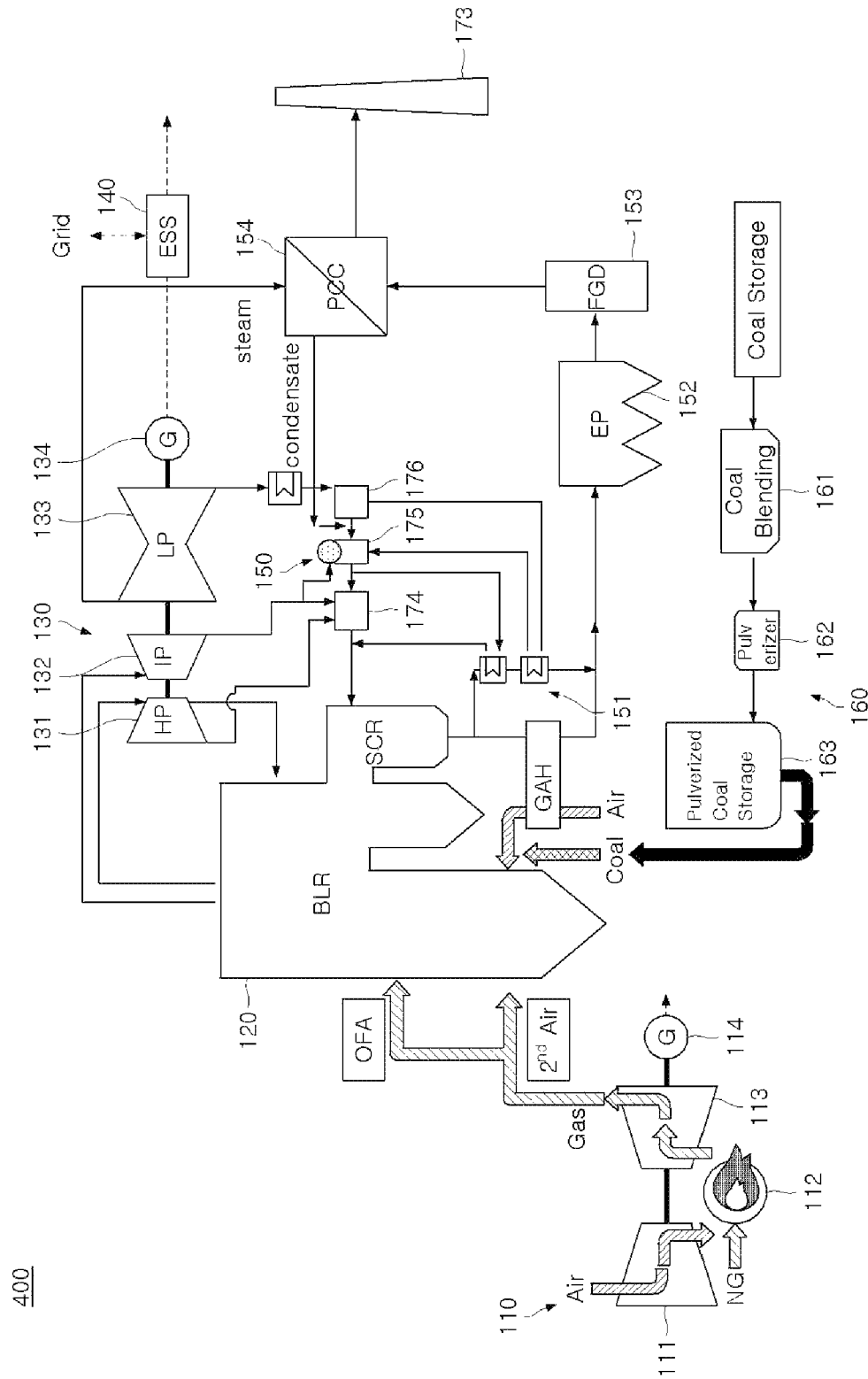
FIG. 6 is a diagram illustrating a hybrid power generation facility according to a fourth exemplary embodiment.

Referring to FIG. 6, a hybrid power generation facility 400 according to a fourth exemplary embodiment further includes a first collecting device 154, which is a post carbon capture (PSS) system. The first collecting device 154 is configured to pass the second combustion gas discharged from the flue gas desulfurization system 153. The second combustion gas passing through the first collecting device 154 flows into the stack 173. Further, the first collecting device 154 passes the steam extracted from the low-pressure turbine 133 and returns the steam to the water supply device 150. The vapor is condensed in the first collecting device 154 and the resulting condensate is returned to the water supply device 150. The carbon dioxide present in the second combustion gas is collected by the first collecting device 154. According to the fourth exemplary embodiment, the emission of carbon dioxide from the facility is reduced and the heat of the condensate is recovered to improve the overall efficiency of the facility.

Figure 7:
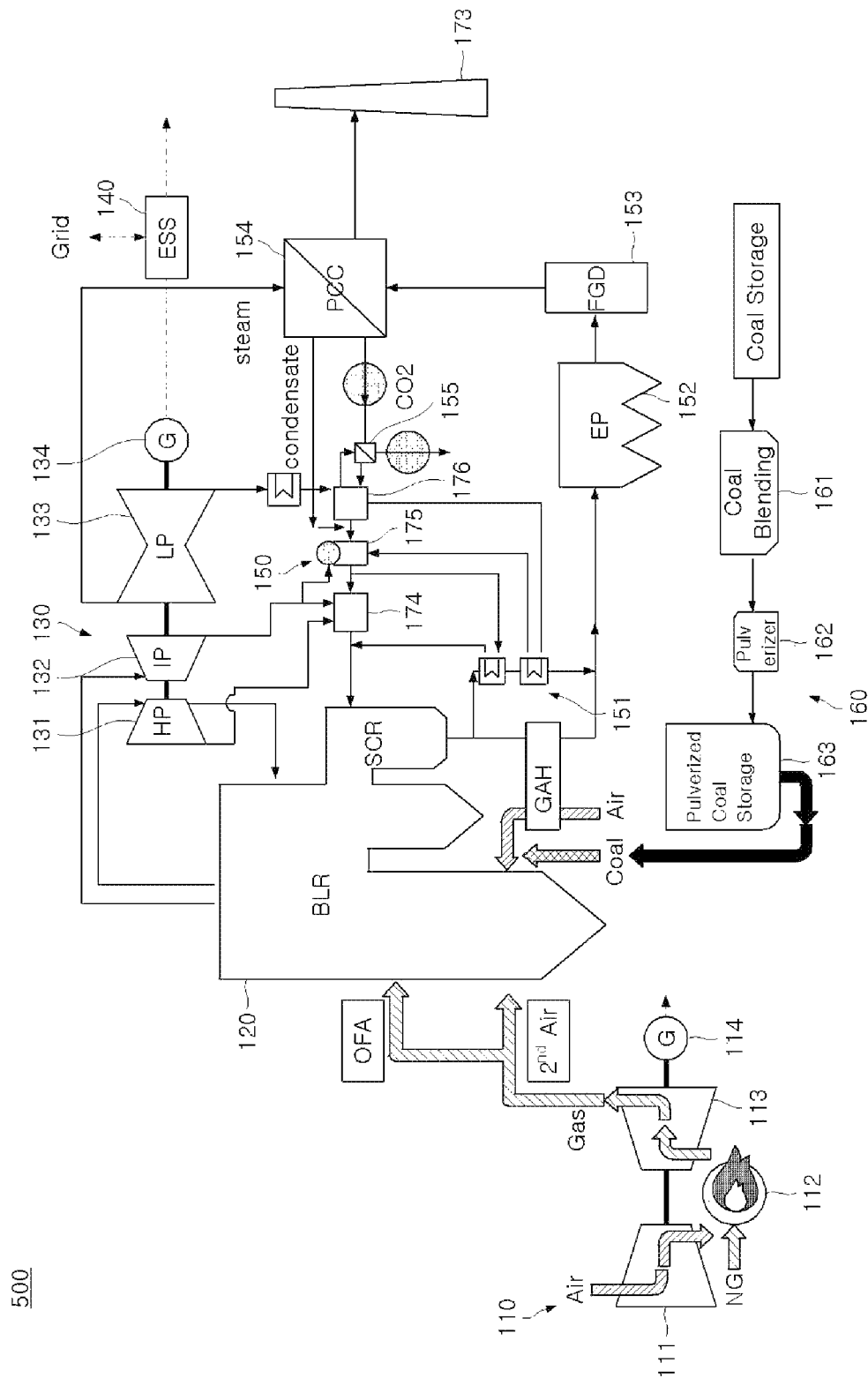
FIG. 7 is a diagram illustrating a hybrid power generation facility according to a fifth exemplary embodiment.

Referring to FIG. 7, a hybrid power generation facility 500 according to a fifth exemplary embodiment further includes a second heat exchanger 155. The carbon dioxide partially collected by the first collecting device 154 is pressurized and the pressurized carbon dioxide passes through the second heat exchanger 155. In addition, low-pressure and high-temperature feed water partially extracted from the water supply device 150 passes through the second heat exchanger 155. Through this, the second heat exchanger 155 is configured such that the carbon dioxide and the feed water perform heat exchange with each other, and the waste heat generated when the carbon dioxide is compressed by the first collecting device 154 can be recovered to the water supply device 150. Therefore, the overall efficiency of the facility can be improved.

Figure 8:
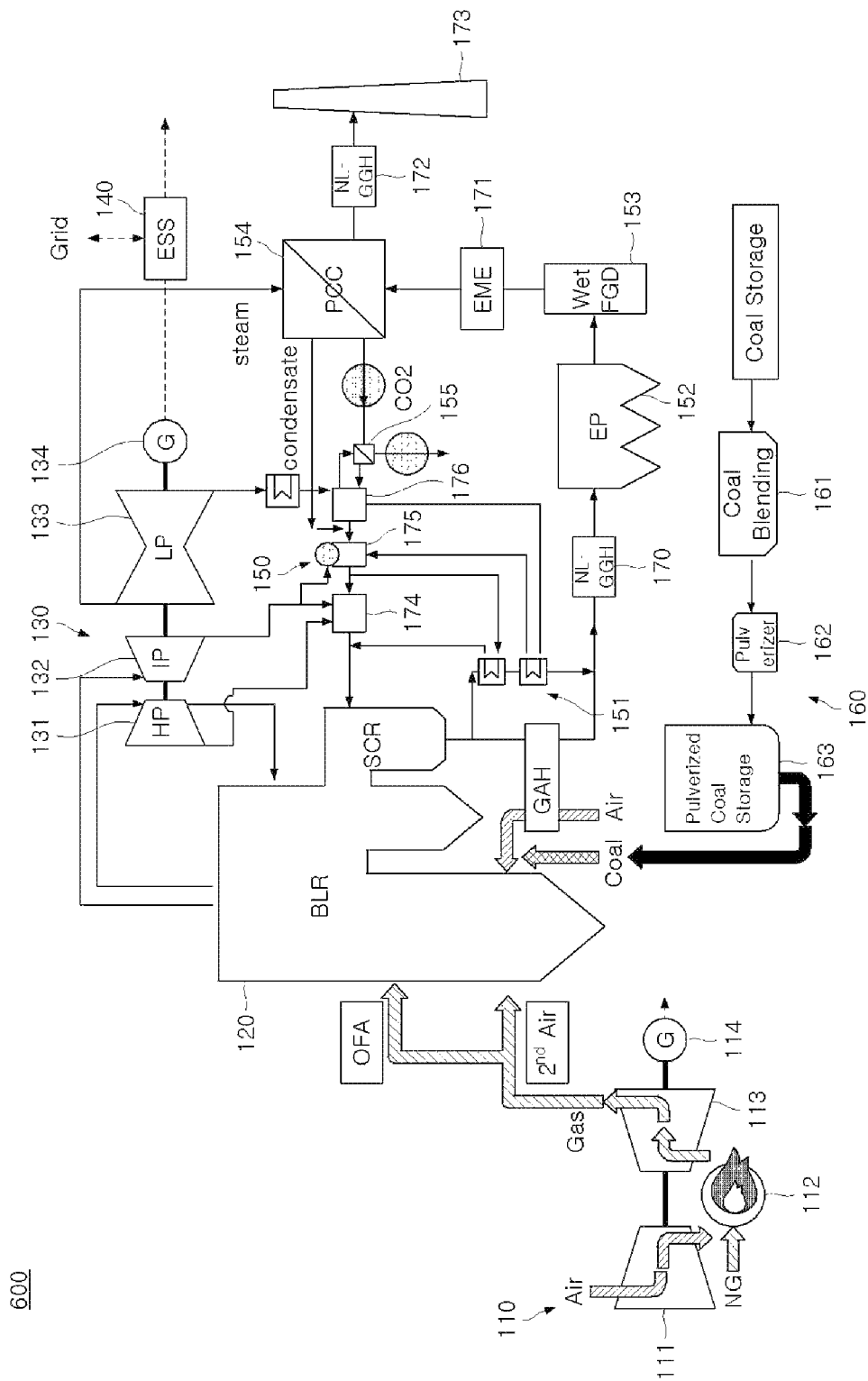
FIG. 8 is a diagram illustrating a hybrid power generation facility according to a sixth exemplary embodiment.

Referring to FIG. 8, a hybrid power generation facility 600 according to a sixth exemplary embodiment further includes a first heater 170 called non-leakage gas-gas heater (NL-GGH), a second collecting device 171 called post carbon capture system, and a second heater 172. The first heater 170 is installed at an input port of the electric precipitator 152 and heats the second combustion gas supplied to the electric precipitator 152. The second collecting device 171 is installed at an output port of the flue gas desulfurization system 153 and traps fine dust. The second heater 172 is installed on a path between the first collecting device 171 and the stack 173 and heats the second combustion gas discharged from the first collecting device 171. According to the sixth exemplary embodiment, the amount of white smoke or fine dust generated in the stack 173 can be reduced.

What is claimed is:

1. A hybrid power generation facility comprising:
    a gas turbine including a compressor configured to compress air introduced from an outside, a combustor configured to mix the compressed air with fuel and to combust the air and fuel mixture, and a turbine configured to produce power with first combustion gas discharged from the combustor;
    a GT (gas turbine) generator configured to generate electric power using a driving force generated by the gas turbine;
    a boiler including a combustion chamber and configured to mix the first combustion gas supplied from the turbine of the gas turbine with air and fuel supplied from the outside;
    a steam turbine through which steam generated in the combustion chamber passes;
    a ST (steam turbine) generator configured to generate electric power using a driving force generated by the steam turbine; and
    an energy storage system configured to be discharged based on an increase rate of power demand of a grid and a maximum increase rate of power supply from the GT generator and the ST generator.

2. The hybrid power generation facility according to claim 1, wherein the ST generator increases the power supply to the grid if the power demand of the grid increases and a maximum increase rate of the power supply from the ST generator exceeds the increase rate of the power demand of the grid.

3. The hybrid power generation facility according to claim 2, wherein if the maximum increase rate of the power supply from the ST generator is equal to or less than the increase rate of the power demand of the grid and if a sum of the maximum increase rate of the power supply from the ST generator to the grid and the maximum increase rate of the power supply from the GT generator to the grid is equal to or greater than the increase rate of the power demand of the grid, the ST generator and the GT generator increase the power supply to the grid.

4. The hybrid power generation facility according to claim 3, wherein if the sum of the maximum increase rate of the power supply from the ST generator to the grid and the maximum increase rate of the power supply from the GT generator to the grid is less than the increase rate of the power demand of the grid, the energy storage system is discharged to supply electric power to the grid, and the ST generator and the GT generator increase the power supply to the grid.

5. A hybrid power generation facility comprising:
    a gas turbine including a compressor configured to compress air introduced from an outside, a combustor configured to mix the compressed air with fuel and to combust the air and fuel mixture, and a turbine configured to produce power with first combustion gas discharged from the combustor;
    a GT (gas turbine) generator configured to generate electric power using a driving force generated by the gas turbine;
    a boiler including a combustion chamber and configured to mix the first combustion gas supplied from the turbine of the gas turbine with air and fuel supplied from the outside;
    a steam turbine through which steam generated in the combustion chamber passes;
    a ST (steam turbine) generator configured to generate electric power using a driving force generated by the steam turbine; and
    an energy storage system configured to be charged based on a decrease rate of power demand of a grid and a maximum decrease rate of power supply from the GT generator and the ST generator.

6. The hybrid power generation facility according to claim 5, wherein the ST generator decreases the power supply to the grid if the power demand of the grid decreases and the maximum decrease rate of the power supply from the ST generator exceeds the decrease rate of the power demand of the grid.

7. The hybrid power generation facility according to claim 6, wherein if the maximum decrease rate of the power supply from the ST generator is equal to or less than the decrease rate of the power demand of the grid and if a sum of the maximum decrease rate of the power supply from the ST generator to the grid and the maximum decrease rate of the power supply from the GT generator to the grid is equal to or greater than the decrease rate of the power demand of the grid, the ST generator and the GT generator decrease the power supply to the grid.

8. The hybrid power generation facility according to claim 7, wherein if the sum of the maximum decrease rate of the power supply from the ST generator to the grid and the maximum decrease rate of the power supply from the GT generator to the grid is less than the decrease rate of the power demand of the grid, the energy storage system is charged with electric power supplied from the ST generator and the GT generator, and the ST generator and the GT generator decrease the power supply to the grid.

9. The hybrid power generation facility according to claim wherein the steam turbine includes a high-pressure turbine configured to pass steam supplied from the boiler and to return the steam passing through the high-pressure turbine returns to the boiler, an intermediate-pressure turbine connected to the high-pressure turbine and configured to pass steam supplied from the boiler, and a low-pressure turbine connected to the intermediate-pressure turbine and configured to pass the steam passing through the intermediate-pressure turbine, and wherein the hybrid power generation facility further comprises a water supply device configured to heat water with steam extracted from the boiler and return the heated water to the boiler.

10. The hybrid power generation facility according to claim 9, further comprising a first heat exchanger through which second combustion gas discharged from the boiler passes and a portion of water flowing into the water supply device passes.

11. The hybrid power generation facility according to claim 1, further comprising an indirect firing system including a mixer configured to mix coal, a pulverizer configured to pulverize the coal into coal particles, and a storage configured to store the coal particles discharged from the pulverizer and to supply the coal particles to the boiler.

12. The hybrid power generation facility according to claim 1, further comprising an electric precipitator and a flue gas desulfurization system through which second combustion gas discharged from the boiler passes.

13. The hybrid power generation facility according to claim 9, further comprising:
an electric precipitator and a flue gas desulfurization system through which second combustion gas discharged from the boiler passes; and
a first collecting device configured to pass the second combustion gas discharged from the flue gas desulfurization system, to pass a portion of the steam extracted from the low-pressure turbine, and to return the steam passing therethrough to the water supply device.

14. The hybrid power generation facility according to claim 13, further comprising a second heat exchanger through which carbon dioxide partially collected from the first collecting device is compressed and passed, and water partially extracted from the water supply device is passed.

15. The hybrid power generation facility according to claim 13, further comprising:
a first heater installed at an input port of the electric precipitator;
a second collecting device installed at an output port of the flue gas desulfurization system and configured to collect dust; and
a second heater installed on a path between the first collecting device and a stack.

16. A method of controlling a hybrid power generation facility including a gas turbine including a compressor configured to compress air introduced from an outside, a combustor configured to mix the compressed air with fuel and to combust the air and fuel mixture, and a turbine configured to produce power with first combustion gas discharged from the combustor, a GT (gas turbine) generator configured to generate electric power using a driving force generated by the gas turbine, a boiler including a combustion chamber and configured to mix the first combustion gas supplied from the turbine of the gas turbine with air and fuel supplied from the outside, a steam turbine through which steam generated in the combustion chamber passes, a ST (steam turbine) generator configured to generate electric power using a driving force generated by the steam turbine, and an energy storage system configured to be discharged based on an increase rate of power demand of a grid and a maximum increase rate of power supply from the GT generator and the ST generator, the method comprising:
increasing, by the ST generator, the power supply to the grid if the power demand of the grid increases and the maximum increase rate of the power supply from the ST generator exceeds the increase rate of the power demand of the grid.

17. The method according to claim 16, further comprising:
increasing, by the ST generator and the GT generator, the power supply to the grid if the maximum increase rate of the power supply from the ST generator is equal to or less than the increase rate of the power demand of the grid and if a sum of the maximum increase rate of the power supply from the ST generator to the grid and the maximum increase rate of the power supply from the GT generator to the grid is equal to or greater than the increase rate of the power demand of the grid.

18. The method according to claim 17, further comprising:
discharging the energy storage system to supply electric power to the grid, and increasing, by the ST generator and the GT generator, the power supply to the grid if the sum of the maximum increase rate of the power supply from the ST generator to the grid and the maximum increase rate of the power supply from the GT generator to the grid is less than the increase rate of the power demand of the grid.

19. A method of controlling a hybrid power generation facility including a gas turbine including a compressor configured to compress air introduced from an outside, a combustor configured to mix the compressed air with fuel and to combust the air and fuel mixture, and a turbine configured to produce power with first combustion gas discharged from the combustor, a GT (gas turbine) generator configured to generate electric power using a driving force generated by the gas turbine, a boiler including a combustion chamber and configured to mix the first combustion gas supplied from the turbine of the gas turbine with air and fuel supplied from the outside, a steam turbine through which steam generated in the combustion chamber passes, a ST (steam turbine) generator configured to generate electric power using a driving force generated by the steam turbine, and an energy storage system configured to be charged based on a decrease rate of power demand of a grid and a maximum decrease rate of power supply from the GT generator and the ST generator, the method comprising:
decreasing, by the ST generator, the power supply to the grid if the power demand of the grid decreases and the maximum decrease rate of the power supply from the ST generator exceeds the decrease rate of the power demand of the grid.

20. The method according to claim 19, further comprising:
decreasing, by the ST generator and the GT generator, the power supply to the grid if the maximum decrease rate of the power supply from the ST generator to the grid is equal to or less than the decrease rate of the power demand of the grid and if a sum of the maximum decrease rate of the power supply from the ST generator to the grid and the maximum decrease rate of the power supply from the GT generator to the grid is equal to or greater than the decrease rate of the power demand of the grid.

21. The method according to claim 20, further comprising:
 charging the energy storage system with electric power supplied from the ST generator and the GT generator, and decreasing, by the ST generator and the GT generator, the power supply to the grid if the sum of the maximum decrease rate of the power supply from the ST generator to the grid and the maximum decrease rate of the power supply from the GT generator to the grid is less than the decrease rate of the power demand of the grid.

* * * * *